United States Patent [19]

Rosemund et al.

[11] 4,060,439

[45] Nov. 29, 1977

[54] POLYURETHANE FOAM COMPOSITION AND METHOD OF MAKING SAME

[75] Inventors: Walter Richard Rosemund, Englewood, N.J.; Charles Vincent Rose, Brewster, N.Y.

[73] Assignee: Union Carbide Corporation, New York, N.Y.

[21] Appl. No.: 656,383

[22] Filed: Feb. 9, 1976

Related U.S. Application Data

[62] Division of Ser. No. 472,173, May 22, 1974, abandoned.

[51] Int. Cl.$^2$ .............................................. B32B 5/18
[52] U.S. Cl. ........................................ 156/78; 156/82; 156/306; 156/272; 260/2.5 AP; 260/2.5 AQ; 260/2.5 BE; 264/45.5; 264/53; 264/321; 264/DIG. 5; 264/DIG. 15; 428/310; 428/313; 428/315; 428/425
[58] Field of Search ............... 156/78, 79, 306, 272, 156/82; 260/2.5 AM, 2.5 AP, 2.5 AZ, 2.5 AQ, 2.5 BE; 252/182; 428/310, 313, 315, 425; 264/45.5, 53, 54, 321, DIG. 5, DIG. 15

[56] References Cited

U.S. PATENT DOCUMENTS

| 2,957,793 | 10/1900 | Dickey | 156/306 |
|---|---|---|---|
| 3,057,766 | 10/1962 | Dickey | 156/82 |
| 3,205,120 | 9/1965 | Flanders | 156/306 |
| 3,245,924 | 4/1966 | Cox et al. | 260/77.5 AG |
| 3,383,351 | 5/1968 | Stamberger | 260/33.2 R |
| 3,423,344 | 1/1967 | Odinak et al. | 260/77.5 AQ |
| 3,497,416 | 2/1970 | Critchfield et al. | 156/306 |
| 3,718,611 | 2/1973 | Maxer et al. | 260/2.5 BE |
| 3,772,224 | 11/1973 | Marlin et al. | 260/2.5 BD |
| 3,775,350 | 11/1973 | Tunas | 260/2.5 AZ |
| 3,824,199 | 7/1974 | Nadeau et al. | 260/2.5 AZ |
| 3,856,718 | 12/1974 | Taub | 260/2.5 AQ |
| 3,867,420 | 4/1975 | Morehouse | 260/2.5 AP |
| 3,869,413 | 3/1975 | Blankenship | 260/2.5 AP |
| 3,887,483 | 6/1975 | Morehouse | 260/2.5 AP |
| 3,896,062 | 7/1975 | Morehouse | 260/2.5 AP |

*Primary Examiner*—Edward G. Whitby
*Attorney, Agent, or Firm*—Bernard Francis Crowe

[57] ABSTRACT

One-shot, flexible polyurethane foams capable of being thermally bonded to various substrates are produced by adding low molecular weight alkylene glycols, glycol ethers, triols, alkanolamine, or polyhydric phenols as modifiers to conventional polyisocyanate foaming mixtures.

14 Claims, No Drawings

POLYURETHANE FOAM COMPOSITION AND METHOD OF MAKING SAME

This is a division of Ser. No. 472,173 filed May 22, 1974 now abandoned.

BACKGROUND OF THE INVENTION

This invention pertains to flexible polyurethane foams which can be thermally bonded to substrates and more particularly to polyurethane foams formulated from polyisocyanates and polyether polyols.

It is known in the art that the urethane linkages of polyurethane foams are formed by the exothermic reaction of a polyfunctional isocyanate and a polyfunctional active hydrogen-containing compound in the presence of a catalyst and a blowing agent. In accordance with the "one-shot process" which is the most widely used industrial technique, direct reaction is effected between the polyisocyanate, and the active hydrogen-containing compound or compounds and is regulated by the catalyst system and surfactant.

It is also well known that suitable active hydrogen-containing compounds include polyether polyols and polyester polyols. However, it is equally well known that while flexible polyurethane foams formulated from polyester polyols have excellent flame lamination properties, those flexible polyurethane foams formulated from polyether polyols are unacceptable for flame lamination. Unfortunately the polyesters used in this application are much more expensive than the polyether polyols. This means that fabricators wishing to bond polyurethane foams derived from polyether polyols must resort to the use of an additional component, namely, an adhesive in order to bond flexible polyurethane foams derived from polyether polyols. The inconvenience and added expense of this procedure is obvious.

Two previous solutions to this problems have been provided but each introduces problems of its own which has left much room for improvement in this art. First of all J. C. Flanders in U.S. Pat. No. 3,205,120 issued on Sept. 7, 1965 describes the preparation of polyether polyol-based polyurethane foams suitable for fabrication of laminates by a heat sealing technique wherein the conventional commercial polyether polyol flexible polyurethane foam reaction mixture contained a minor amount of a polyol having a molecular weight of 200 to 1500. The preferred low molecular weight polyol was tris(dipropylene glycol) phosphite. Other low molecular weight polyols disclosed by Flanders include alkylene oxide adducts of polyhydroxy alkanes, phosphorus-containing acids, and the like. It was later found that there are processing difficulties encountered in the production of the Flanders polyether polyurethane foams that stem from the high reactivity of the polyether polyol mixture. These difficulties at least cancel the cost advantage of the polyether polyol based foam over polyester polyol based foam with the result that there has been no great incentive for laminate manufacturers to switch from polyester to polyether.

The second improvement described by F. E. Critchfield and R. D. Whitman in U.S. Pat. No. 3,497,416 issued on Feb. 24, 1970 comprises the use, in the production of heat-sealed polyurethane foam laminates, of polyurethane foam which is produced by reacting, in the presence of a foaming agent, a polyether polyol with the reaction product of an aromatic polyisocyanate and dipropylene glycol or dibutylene glycol. This reaction product, a quasi-prepolymer, is prepared by using an excess of an aromatic polyisocyanate over the amount of dipropylene glycol and/or dibutylene glycol used. While this disclosure constitutes a further advance in the art, it is still not completely satisfactory for commercial use by laminate manufacturers because in order to obtain an open foam one must incorporate a powerful cell opening agent, such as, dimethylformamide. The use of a cell opener is normally not used in polyurethane foam processing. In addition these polyurethane foams have very high compression sets which are unacceptable for most end use applications.

SUMMARY OF THE INVENTION

It has now been found possible to thermally bond a flexible polyether polyurethane to a substrate without the disadvantages of the prior art by a method which comprises:

A. Reacting and foaming a composition consisting essentially of:
  a. polyisocyanate reactant containing at least two isocyanato groups per molecule;
  b. at least one polyol reactant having a molecular weight of at least about 2000 and containing an average of at least 2 hydroxyl groups per molecule;
  c. a blowing agent;
  d. a catalyst;
  e. a surfactant; and about 1 to about seven percent, based on the weight of polyether polyol, of at least one polyol modifier selected from the class consisting of:
    1. alkylene glycols having 2 to about 8 carbon atoms,
    2. glycol ethers having the empirical formula:

$$HO\!\!+\!\!C_nH_{2n}O\!\!+\!\!_m H$$

wherein $n$ is an integer having values of 2 to 4 and $m$ is an integer having values 2 to 4 when $n$ is 2, 2 to 3 when $n$ is 3 and 2 when $n$ is 4;
    3. triols having the empirical formula $$C_xH_{2x-1}(OH)_3$$

wherein $x$ is an integer having values of 3 to about 10;
    4. alkanolamines having the empirical formula $$C_yH_{2y}N_z(OH)_p$$

wherein $y$ is an integer having values of 2 about 10, and $z$ is an integer having values of 1 to 2 and $p$ is an integer having 2 to 4; and
    5. polyhydric mononuclear phenols;

B. Heating the surface of the foamed composition of (A) above its melting or fusion temperature;

C. Contacting the melted or fused surface of the foamed composition of (A) with a substrate, whereby a flexible polyurethane foam/substrate laminate is formed; and D. Cooling the flexible polyurethane foam/substrate laminate below the melting or fusion point of the flexible polyurethane foam.

DESCRIPTION OF THE INVENTION

Although about one to about seven percent of polyol modifier can be used in this invention, it is preferred to use about two to about 6 percent based on the weight of polyether polyol employed in the foaming composition.

Illustrative of the alkylene glycols having 2 to about 8 atoms used in this invention are ethylene glycol, 1,2-propylene glycol, 1,3-propylene glycol, 1,2-butylene glycol, 1,3-butylene glycol, 1,4-butylene glycol, 1,2-pentylene glycol, 1,5-pentylene glycol, 1,2-hexylene glycol, 1,4-hexylene glycol, 1,2-heptylene glycol, 1,7-heptylene glycol, 1,2-octylene glycol, and 1,8-octylene glycol and the like.

Exemplary glycol ethers useful in this invention include diethylene glycol, di(1,2-propylene) glycol, di(1,3-propylene) glycol, triethylene glycol, tetraethylene glycol, tri(1,2-propylene) glycol, tri(1,3-propylene) glycol, and dibutylene glycol.

Representative examples of triols useful in this invention include glycerine, 2-methyl-2 hydroxy methyl-1,3-propane diol, 2-ethyl-2-hydroxymethyl 1-1,3-propane diol and the like.

Alkanolamines which can be used include: diethanolamine, di-n-propanolamine, di-isopropanolamine, tri-n-propanolamine, tri-isopropanolamine, di-n-butaanolamine, diisobutanolamine, tri-n-ethanolamine, di-n-pentanolamine, di-isopentanolamine, N,N'-dihydroxyethyl ethylene diamine, and the like.

Representative polyhydric mononuclear phenols include catechol, resorcinol, hydroquinone, pyrogallol, hydroxyhydroquinone and phloroglucinol.

The polyisocyanate reactants used in making the flexible polyurethane foams of this invention are known in the art and any such reactants can be suitably employed in producing the flexible polyurethane foams. Among such suitable polyisocyanates are those represented by the general formula:

wherein $i$ has an average value of at least 2 and is usually no more than 6, and Q represents an aliphatic, cycloaliphatic or aromatic radical which can be an unsubstituted hydrocarbyl group or a hydrocarbyl group substituted, for example, with halogen or alkoxy. For example, Q can be an alkylene, cycloalkylene, arylene, alkyl-substituted cycloalkylene, alkarylene, or aralkylene radical including corresponding halogen-and alkoxy-substituted radicals. Typical examples of polyisocyanates which can be used in preparing the polyurethanes of this invention are any of the following including mixtures thereof: 1,6-hexamethylene diisocyanate, 1,4-tetramethylene diisocyanate, 1-methyl-2,4-diisocyanatocyclo hexane, bis(4-isocyanato phenyl)methane, phenylene diisocyanates such as 4-methoxy-1,4-phenylene diisocyanate, 4-chloro-1,3-phenylene diisocyanate, 4-bromo-1,3-phenylene diisocyanate, 5,6-dimethyl-1,3-phenylene diisocyanate, 2,4-tolylene diisocyanate, 2,6-tolylene diisocyanate, crude tolylene diisocyanates, 6-isopropyl-1,3-phenylene diisocyanate, durylene diisocyanate, triphenylmethane-4,4',4"-triisocyanate, and other organic polyisocyanates known to the polyurethane art. Of the aforesaid types of isocyanates, those containing aromatic nuclei are generally preferred.

Also useful as the polyisocyanate reactants are polymeric isocyanates having units of the formula:

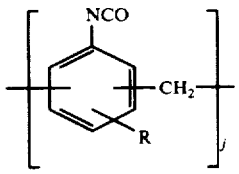

wherein R is hydrogen and/or lower alkyl and $j$ has an average value of at least 2.1. Preferably the lower alkyl radical is methyl and $j$ has an average value of from 2.1 to about 3.0. Particularly useful polyisocyanates of this type are the polyphenylmethylene polyisocyanates produced by phosgenation of the polyamine obtained by acid catalyzed condensation of aniline with formaldehyde. Polyphenylmethylene isocyanates of this type are available commercially under such trade names as PAPI, NIAX, Isocyanate AFPI, Mondur MR, Isonate 390P, NCO-120, Thanate P-200, NCO-10 and NCO-20. These products are low viscosity (50–500 centipoises at 25° C) liquids having average isocyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than 2 isocyanate groups per molecule. Illustrative of such combinations are: a mixture of 2,4-tolylene diisocyanate, 2,6-tolylene diisocyanate and the aforesaid polyphenylmethylene polyisocyanate and/or polymeric tolylene diisocyanates obtained as residues from the manufacture of the diisocyanates.

On a combined basis, the polyether polyol and organic polyisocyanate usually constitute the major proportion by weight of the polyurethane-forming reaction mixture. In general, the polyisocyanate and polyether polyol reactants are employed in relative amounts such that the ratio of total-NCO equivalents to total active hydrogen equivalents (of the polyether polyol and any water, when used) is from 0.8 to 1.5, preferably from 1.0 to 1.15 equivalents of —NCO per equivalent of active hydrogen. This ratio is known as the Isocyanate Index and is often also expressed as percent of the stoichiometric amount of polyisocyanate required to react with total active hydrogen. When expressed as a percent, the Isocyanate Index may be from 80 to 150, and is preferably within the range from about 100 to about 115.

In producing the flexible polyurethane foams of the present invention, one or more polyether polyols is employed for reaction with the polyisocyanate reactant to provide the urethane linkage. Such polyols have an average of at least 2 and usually not more than 6 hydroxyl groups per molecule and include compounds which consist of carbon, hydrogen, and oxygen and compounds which also contain phosphorus, halogen and/or nitrogen. Such polyols also have an average molecular weight of at least about 2000.

Among the suitable polyether polyols that can be employed are the poly(oxyalkylene) polyols, that is alkylene oxide adducts of water or a polyhydric organic compound used as the initiator or starter. Suitable polyhydric organic initiators include the following individually or in combination: Ethylene glycol; diethylene glycol; propylene glycol; 1,5-pentanediol; hexylene glycol; dipropylene glycol; trimethylene glycol; 1,2-cyclohexanediol; 3-cyclohexane-1, 1-dimethanol; glycerine; 1,2,6-hexane triol; 1,1,1-trimethyolethane; 1,1,1- trimethyolpropane; 3-(2-hydroxy ethoxy)-and 3-(2-hydroxypropoxy)-1,2-propane diols; 2,4-dimethyl-2-(2-hydroxyethoxy) methylpentanediol-1 5; 1, 1-tris [(2-hydroxyethoxy) methyl] ethane; 1,1,1-tris [2-hydroxy propoxy) methyl] propane; pentaerythritol; sorbitol; sucrose; alpha-methyl glucoside; and the like.

The above-described polyether polyols are prepared in accordance with well known techniques comprising the reaction of the polyhydric starter and an alkylene oxide in the presence of an oxyalkylation catalyst which is usually an alkaline metal hydroxide. The oxyalkylation of the polyhydric initiator is carried out at temperatures ranging from about 90° C to about 150° C and usually at an elevated pressure to about 200 psig, employing a sufficient amount of alkylene oxide and adequate reaction time to obtain a polyol of desired molecular weight which is conveniently followed during the course of the reaction, by standard hydroxyl number determinations. As is well known in the art the hydroxyl numbers are determined by and are defined as the number of milligrams of potassium hydroxide required for the complete neutralization of the hydrolysis product of the fully acetylated derivative prepared from one gram of polyol or mixture of polyols. The hydroxyl number is also defined by the following equation whcih indicates its relationship with the molecular weight and functionality of the polyol:

$$OH = 56.1 \times 1{,}000 \times f/M.W.$$

wherein OH equals hydroxyl number of the polyol, $f$ equals average functionality, that is, the average number of hydroxyl groups per molecule of polyol, and M.W. equals average molecular weight of polyol.

The alkylene oxide usually employed in the polyether polyol reactants are the lower alkylene oxides, that is, compounds having from 2 to 4 carbon atoms including ethylene oxide, propylene oxide, butylene oxides (1,2' or 2,3') in combination thereof. When more than one type of oxyalkylene unit is desired in the polyol product, the alkylene oxide reactants may be fed to the reaction system sequentially to provide polyoxyalkylene chains containing respective blocks of different oxyalkylene units or they may be fed simultaneously to provide substantially random distribution of the units. Alternatively, the polyoxyalkylene chains may consist essentially of one type of oxyalkylene unit, such as, oxypropylene capped with oxyethylene units.

The second class of polyether polyols which is suitable for use in preparing the flexible polyurethane foams of the present invention are graft polymer polyether polyols. Such reactants are produced by polymerizing one or more ethylenically unsaturated monomers dissolved or dispersed in a polyether polyol in the presence of a free radical catalyst. Suitable polyether polyols for producing such composition include, for example, any of the above described polyols. Illustrative of suitable ethylenically unsaturated monomers are those encompassed by the general formula

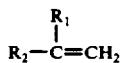

wherein $R_1$ is hydrogen, methyl or any of the halogens (i.e., fluorine, chlorine, bromine, or iodine); and $R_2$ is $R_1$, cyano, phenyl, methyl-substituted methyl, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alpha-methyl styrene, and butadiene. These and other polymer polyol compositions which are suitably employed either individually or in combination with polyether polyols described above are those described in British Pat. No. 1,063,222 and U.S. Pat. No. 3,383,351, the disclosures of which are incorporated herein by reference. Such compositions are prepared by polymerizing the monomers in the polyol at a temperature between about 40° C. and about 150° C. employing any free radical-generating initiator including peroxides, persulfates, percarbonates, perborates, or azo compounds, such as, for example, hydrogen peroxide, dibenzoyl peroxide, benzoyl hydroperoxide, lauroyl peroxide, and azobis (isobutyronitrile).

When used in the practice of this invention, the polymer polyol composition usually contains from about 5 to about 50, and more usually from about 10 to about 40 weight percent of the ethylenically unsaturated monomer polymerized in a polyether polyol. Especially suitable polymer/polyols are those containing:

A. from about 10 to about 30 weight percent of a copolymer of (1) acrylonitrile or methacrylonitrile, and (2) styrene or alpha-methyl styrene, the said copolymer containing from about 50 to 75 and from about 50 to 25 weight percent of (1) and (2), respectively;

B. from about 90 to about 70 weight percent of the polyether polyol and particularily tri-functional polyols such as alkylene oxide adducts of glycerine.

The urethane-forming reaction is effected in the presence of a minor amount of a catalyst comprising an amine catalyst and a metal catalyst useful in promoting gelation of the foaming mixture. The amine component of the polyurethane-forming reaction mixture is usually a tertiary amine. Suitable amine catalysts include one or more of the following: N-methyl-morpholine; N-ethyl-morpholine, N-octodecylmorpholine; N,N,N'N', tetramethylethylenediamine; N,N,N'N', tetramethyl-1,3-butanediamine; hexadecyldimethylamine; N,N-dimethylbenzylamine; and the like. The amine catalyst may be introduced to the polyurethane-producing reaction mixture as such or as a solution in a suitable solvent.

The amine catalyst is present in the final polyurethane-producing reaction mixture in an amount of from about 0.05 to about 3 parts by weight of active catalyst, that is, the amine (exclusive of other components present in solutions thereof) per 100 parts by weight of the polyether polyol reactant.

Metal catalysts which are also used in conjunction with the amine catalyst in producing polyurethanes from polyether polyols include organic derivatives of tin, particularly the tin compounds of carboxylic acids such as stannous octoate, stannous oleate, stannous acetate, stannous laurate, dibutyl tin dilaurate, and other such tin salts. Additional metal catalysts are organic derivatives of other polyvalent metals such as zinc and nickel (e.g., nickel acetylacetonate). In general, the amount of such metal cocatalysts which can be present in the polyurethane-producing reaction mixture is within the range from about 0.05 to about 2 parts by weight per 100 parts by weight of the polyether polyol reactant.

Foaming is accomplished by the presence in the reaction mixture of varying amounts of a polyurethane blowing agent, such as, water which upon reaction with isocyanate generates carbon dioxide in situ, or through the use of blowing agents which are vaporized by the exothermic reaction, or by a combination of the two methods. These various methods are known in the art. Thus in addition to or in place of water, blowing agents which can be employed in the presence of this invention include methylene chloride, liquified gases which have boiling points below 80° F (27° C) and above −60° F (−52° C), or other inert gases such as nitrogen, carbon dioxide added as such, methane, helium and argon. Suitable liquifying gases include aliphatic and cyclofluorocarbons which vaporize at or below the temperature of the foaming mass. Such gases are at least partially fluorinated and may also be otherwise halogenated. Fluorocarbon blowing agents suitable for use in foaming the formulations of this invention include trichloromonofluoromethane, dichlorodifluoromethane, 1,1-dichloro-1-fluoroethane, 1,1,-1-trifluoro-2-fluoro-3,3-difluoro-4,4,4-trifluorobutane, hexafluorocyclobutane and octafluorocyclobutane. Another useful class of blowing agents include thermally-unstable compounds which liberate gases upon heating, such as N,N-;dimethyl-N,N-dinitrosoterephthalamide, and the like. The generally preferred method of foaming for producing flexible foams is the use of water or a combination of water plus a fluorocarbon blowing agent such as trichloromonofluoromethane.

The amount of blowing agent employed in the foaming reaction will vary with factors such as density that is desired in the foam product. Usually, however, from about 1 to about 30 parts by weight of the blowing agent per 100 parts by weight of the polyether polyol reactant is preferred.

The polyurethane foam of this invention may be formed in accordance with any of the processing techniques known to the arts such as, in particular, the one-shot technique. In accordance with this method, foamed products are provided by carrying out the reaction of the polyisocyanate and polyether polyol simultaneously with the foaming operation. It is to be understood that the relative amounts of the various components of the conventional foam formulations are not narrowly critical. The polyether polyol and polyisocyanate are present in the foam-producing formulation in a major amount. The relative amounts of these two components is the amount required to produce the urethane structure of the foam and such relative amounts are well known in the art. The source of the blowing agent such as water, auxiliary blowing agents, amine catalyst and metal catalyst of the present invention are each present in a minor amount necessary to achieve the function of the individual component. Thus the blowing agent is present in an amount sufficient to foam the reaction mixture, the amine catalyst and metal catalyst are each present in a catalytic amount (i.e., an amount sufficient to catalyze the reaction to produce the urethane at a reasonable rate) and the surfactant is present in a foam-stabilizing amount. The preferred amounts of these various components are as given herein.

Suitable surfactants include a foaming stabilizer, as for example, a pluronic hydrolyzable polysiloxane-polyoxyalkylene block copolymer such as block copolymers described in U.S. Pat. Nos. 3,834,748 and 2,917,480. Another useful class of emulsifying agents or surfactants is the non-hydrolyzable polysiloxanes or polyoxyalkylene block copolymers such as those described in U.S. Pat. No. 3,505,377.

The preferred substrates are polyurethanes, paper, kraft paper, leather, hides, cotton, linen, silk, hemp, jute, wool, flax, nylons, polyesters, Orlon, Dacron, rayon, rayon acetates, styrene polymers, vinyl chloride polymers and the like. The invention is not limited to any substrate and hence includes not only the above-enumerated substrates but also both ferrous and non-ferrous metals, vitreous materials including glass, ceramics, clays, china, porcelain, and the like: cellulosic substrates including wood, ply-wood, cane, bamboo, rattan, and the like; proteinaceous materials including gelatin, and the like; natural fibers; as well as, building materials, including brick, granite, sandstone, plaster, tile, wall board, cement blocks, and the like; thermosetting polymers such as phenol-aldehyde condensation polymers, phenol ureas resins, epoxy resins, coumaronein-dene polymers and the like; and thermoplastic polymers such as acrylonitrile polymers, polycarbonates, polyacetals, polyamides, synthetic rubber, polyethylene, polypropylene, and the like.

The laminated structures of the invention can be used for various purposes such as insulation or padding of clothing where the substrate would be cloth, the sound deadening and insulation of building materials, e.g. preformed panels and the like. Blocks of polyurethane foam can be heat sealed to each other (buttwelded) to form larger sections from smaller sections. Single-ply or multi-ply laminates can be fabricated with this invention.

Other uses for the laminates of this invention include the preparation of preformed cushioning for furniture, automobile seats, crash pads and the like.

The laminates of the invention are produced by heating part or all of the surface of the urethane foam described above to a temperature above the fusion temperature of the foam to form a tacky liquid or semi-liquid layer, and thereafter or concurrently with the heating operation, applying the substrate to the tacky surface of the foam and holding in contact therewith while cooling until the surface cools and resolidifies, thereby forming an adhesive bond between the foam and the substrate. The fusion temperature of the foam will vary depending upon the nature and proportion of the components therein, but in general is in the range of from about 204° C. to about 315° C. It is in general desirable not to heat the surface of the foam to a temperature higher than about 38° C. above the fusion temperature of the particular foam.

Preferred methods include flame treatment of the surface or a heat sealing means with the polyurethane foam passing continuously over the heating source and then passing directly into contact with the desired substrate. Dielectric heating, heating lamps, e.g. infrared lamps, hot plates, hot air guns and the like can also be used.

Although not necessary, it is preferred to employ a moderate amount of pressure in contacting the substrate with the polyurethane foam whose surface has been brought above its melting or fusion point. The pressure can be as low as that resulting from the weight of the foam or the substrate but is preferably in the range of about 0.1 to about 100 or more pounds per square inch.

The invention is further described in the Examples which follow. All parts and percentages are by weight unless otherwise specified.

Foaming Procedure I — Bench Scale

The general procedure used for the preparation of the flexible polyurethane foams used in this invention is as follows.

Polyether polyol was dispensed into a container along with the polyol to be evaluated by stirring with a spatula until a homogeneous solution was obtained. Optional additives such as flame retardants can be added at this point if desired to prepare a flame retardant polyurethane foam. Surfactant, water, amine catalyst, and fluorocarbon blowing agent were then added to the mixture followed by mixing with a spatula.

The contents of the container were agitated for 15 seconds at 2000 revolutions per minute. Stannous octoate co-catalyst was then added by means of a hypodermic syringe. After agitating for an additional 8 seconds, the polyisocyanate reactant was added rapidly and agitation continued for a another 7 seconds. The mixture following agitation was then poured into a parchment lined box (12 inches × 12 inches × 12 inches) supported by a wooden mold. The foam was allowed to rest in the mold for at least 3 minutes and then cured for 5 minutes (unless otherwise noted in the examples) at 125° C. The foams were than allowed to cure for 24 hours at ambient temperature before evaluation. After cutting, the following properties were determined:

Height of rise
Breathability
Density
Foam-to-foam bond strength
Burning extent (flame retardant foams only)

During foam preparation, cream time, rise time and top collapse are measured.

Breathability denotes the porosity of a foam and is roughly proportional to the number of open cells in a foam. In accordance with the NOPCO test procedure described by R. E. Jones and G. Fesman, "Journal of Cellular Plastics," January, 1965 breathability was measured as follows: a 2 inches × 2 inches × 1 inch piece of foam was cut from near the center of the test speciment. Using a NOPCO foam breathability tester, type GP-2Model 40GD10, air was drawn through the one inch portion at a pressure differential of 0.5 inches of water less than atmospheric pressure. The air flow was parallel to the direction of original foam rise. The degree of openness of the foam (or foam breathability) is measured by air flow and is expressed as standard cubic feet per minute (SCFM).

Foam density, expressed in pounds per cubic foot, (pcf) is the weight of the foam divided by its volume.

Foam-to-foam bond strength is determined by bonding two foam samples cut to a size ⅛ inches by 2 inches by six inches with a Vertrod Model 8HTV Heat Sealing Machine. Dwell time and temperature was set at a maximum and foam sample was sealed. This procedure was repeated several times as noted by "number of cycles" in the Examples, infra. A bond was formed which was 2 inches long by about ¼ inches wide. The bonded foam sample was allowed to age at ambient conditions for at least 24 hours. Bond strengths were then determined using a Table Model TM Instron machine set at a cross-head speed of two inches per minute and two inches per minute chart speed. The foam samples were held using pneumatic tensile jaws. Bond strengths were reported in pounds per linear inch.

Cream time is the time in seconds that the foaming mixture takes to become heterogeneous. This condition was ascertained by observing the time taken for the clear mixture to change to a milky white color.

Rise time is the time in seconds taken to achieve maximum height of rise in the foam.

Top collapse is the amount in inches a foam decreases in height after maximum rise.

EXAMPLES 1-6

The enhancement of the thermal bonding properties of a conventional polyurethane foam was demonstrated in the following examples by the addition of varying amounts of dipropylene glycol as the polyol modifier.

Using the procedure described supra 72 parts of polyether polyol I (the reaction product of glycerine with a mixture of 86%, 1,2-propylene oxide and 14% ethylene oxide having a molecular weight of 3500) was blended with 24 parts of polyether polyol II (the product obtained by the interaction of 80% of an adduct polymer obtained by reacting glycerine with 1,2-propylene oxide having a molecular weight of 3000 interpolymerized with about 20% of a blend of styrene and acrylonitrile) and employed as the polyether polyol components of the urethane foaming compositon together with 4 parts of dipropylene glycol as the polyol modifier. Four parts of water was added as blowing agent together with 2 parts of amine catalyst (1 ) [a blend of a major amount of dimethylaminopropionitrile and a minor amount of bis(2-dimethylaminoethyl) ether], 1 part of L-6202 (a commercial silicone-polyether copolymer foam stabilizer available from Union Carbide Corp.), 0.15 parts of stannous octoate, 2 parts of dichlorodifluoromethane, and 53.5 parts of tolylene diisocyanate (a mixture of 80% 2,4-tolylene diisocyanate and 20% 2,6-tolylene diisocyanate). The Isocyanate Index was 105. The Isocyanate Index is the percent of the stoichiometric amount of polyisocyanate required to react with total active hydrogen. This index is preferably in the range of about 100 to about 115. The hydroxyl number of the total polyol blend including the dipropylene glycol additive was 79.3. Pertinent physical properties of the foam obtained including foam-to-foam bond strengths are presented in Table I together with 4 additional examples and a Control A demonstrating the improvement in foam-to-foam bond strengths with increasing amounts of dipropylene glycol modifier and the extremely low bond strength in the Control A in which no dipropylene glycol modifier was used. The data in Table I also show that based on settling and breathability data foams are more difficult to make, that is, the stannous octoate operating latitude is diminished as the dipropylene glycol modifier concentration is increased. This demonstrates that the amount of low molecular polyol modifier used in this invention has a critical upper limit as defined supra. These data presenting bond-to-bond strengths values also establish that the lower limit is critical as well.

TABLE I

EXAMPLES 1 - 4
EFFECT OF DIPROPYLENE GLYCOL ON FOAM-TO-FOAM BOND STRENGTHS

| EXAMPLE NO. | 1 | 2 | 3 | 4 | Control A |
|---|---|---|---|---|---|
| Polyether Polyol I (parts) | 72 | 71.3 | 70.5 | 69.7 | 100 |

TABLE I-continued

EXAMPLES 1 - 4
EFFECT OF DIPROPYLENE GLYCOL ON FOAM-TO-FOAM BOND STRENGTHS

| EXAMPLE NO. | 1 | 2 | 3 | 4 | Control A | |
|---|---|---|---|---|---|---|
| Polyether Polyol II (parts) | 24 | 23.7 | 23.5 | 23.3 | 0 | |
| Dipropylene Glycol (parts) | 4.0 | 5.0 | 6.0 | 7.0 | 0 | |
| Water (parts) | 4.0 | 4.0 | 4.0 | 4.0 | 3.0 | |
| Amine Catalyst[(1)] (parts) | 2.0 | 2.0 | 2.0 | 2.0 | 0.1 | Amine Catalyst[(3)] |
| Surfactant L-6202[(2)] (parts) | 1.0 | 1.0 | 1.0 | 1.0 | 1.0 | L-520 |
| Stannous Octoate (parts) | 0.15 | 0.15 | 0.10 | 0.10 | 0.25 | |
| Dichlorodifluoromethane | 2.0 | 2.0 | 2.0 | 2.0 | 0 | |
| 80/20 TDI (105 index) | 53.5 | 54.6 | 56.1 | 57.4 | 49.0 | |
| Hydroxyl Number of polyol blend (includes dipropylene glycol) | 79.3 | 87.1 | 95.0 | 102.9 | 49.0 | |
| Cream Time (sec.) | 9.5 | 8.5 | 8.0 | 8.0 | 13.0 | |
| Rise Time (sec.) | 74 | 73 | 78 | 78 | 115 | |
| Top Collapse (in.) | 0.0 | 0.2 | 1.2 | 0.8 | 0.0 | |
| Height of Rise (in.) | 7.6 | 7.9 | 6.9 | 6.8 | 5.2 | |
| Breathability (SCFM) | 6.3 | 5.5 | 6.3 | 5.0 | 3.3 | |
| Density (pcf) | 1.50 | 1.47 | 1.49 | 1.49 | 2.01 | |
| Foam-To-Foam Bond Strength (lbs./in.) | | | | | | |
| 3 cycles | 2.9 | 2.9 | 4.8 | 4.7 | 0.4 | |
| 4 cycles | 3.7 | 4.3 | 4.2 | 5.2 | 0.6 | |

[(1)]Blend of a major amount of dimethylaminopropionitrile and a minor amount of bis(2-dimethylaminoethyl) ether.
[(2)]Polysiloxane-polyoxyalkylene block copolymer marketed by Union Carbide Corp.
[(3)]70% Solution of bis(2-dimethylaminoethyl) ether in dipropylene glycol.

As the concentration of dipropylene glycol modifier is increased in these Examples, the hydroxyl number of the total polyol blend increases along with the bond-to-bond strengths. Controls B-I show that mere adjustment of the hydroxyl number of the polyether polyol component will not give results equivalent to the compositions containing low molecular weight polyols as well. This is demonstrated in Table II where urethane foaming Control compositions comparable to those in Examples 1 to 4 were prepared and foamed with the exception that no dipropylene glycol modifier was present. Polyether Polyol I was used as the polyether low molecular weight polyol modifier such as dipropylene glycol is surprisingly and unexpectedly unique in improving bond-to-bond strengths of thermally bonded polyurethane foams. This unexpected finding is also corroborated in Table II where it can be seen that the Control H which used Polyether Polyol V, having an hydroxyl number of 112 and an average molecular weight of 2240 afforded a polyurethane bond with a very low bond-to-bond strength, further supporting the conclusion that molecular weight variations of a base polyol are not the controlling key to obtaining polyurethane foams with high bond-to-bond strength.

TABLE II

| CONTROL | CONTROLS B - I | | | | | | | |
|---|---|---|---|---|---|---|---|---|
| | B | C | D | E | F | G | H | I |
| (parts) Polyether Polyol I | 100 | — | — | 100 | — | — | — | — |
| (parts) Polyether Polyol III | — | 100 | — | — | 100 | — | — | — |
| (parts) Polyether Polyol IV | — | — | 100 | — | — | 100 | — | — |
| (parts) Polyether Polyol V | — | — | — | — | — | — | 100 | — |
| (parts) Polyether Polyol VI | — | — | — | — | — | — | — | 100 |
| Water (parts) | 3.0 | 3.0 | 3.0 | 4.0 | 4.0 | 4.0 | 2.5 | 3.0 |
| Amine Catalyst[(a)] (parts) | 0.1 | 0.1 | 0.1 | 0.1 | 0.1 | 0.1 | 0.1 | 0.1 |
| Stannous Octoate (parts) | 0.25 | 0.25 | 0.20 | 0.25 | 0.25 | 0.20 | 0.20 | 0.10 |
| Surfactant L-520 (parts)[(b)] | 1.0 | 1.0 | 1.0 | 1.0 | 1.0 | 1.0 | — | — |
| L-540/Y-4499[(c)] parts | — | — | — | — | — | — | 3.0 | — |
| L-540 (parts)[(b)] | — | — | — | — | — | — | — | 1.0 |
| 80/20 TDI (105 index) | 38.4 | 40.0 | 42.3 | 48.6 | 50.1 | 52.8 | 45.3 (100 index) | 69.5 |
| Polyol Hydroxyl Number | 49.0 | 58.5 | 75.3 | 49.0 | 58.5 | 75.3 | 112.0 | 240.0 |
| Cream Time (sec.) | 13 | 12 | 12 | 12 | 12 | 12 | 16 | 15 |
| Rise Time (sec.) | 115 | 123 | 127 | 88 | 104 | 100 | 130 | 90 |
| Top Collapse (in.) | 0.0 | 0.0 | 0.0 | 0.0 | 0.0 | 0.0 | 0.0 | 0.0 |
| Height of Rise (in.) | 5.2 | 5.0 | 5.5 | 7.1 | 7.1 | 7.3 | — | — |
| Breathability (SCFM) | 5.3 | 4.0 | 4.5 | 4.3 | 5.5 | 6.0 | — | — |
| Density (pcf) | 2.01 | 2.00 | 1.96 | 1.58 | 1.62 | 1.55 | — | — |
| Foam-to-Foam Bond Strength (lbs./inch) 3 cycles | — | — | — | — | — | — | 0.9 | — |
| 4 cycles | 0.7 | 0.5 | 0.2 | 0.8 | 1.5 | 0.9 | 1.1 | — |
| 5 cycles | 0.5 | 0.2 | 0.4 | 0.8 | 1.3 | 0.7 | — | — |

[(a)]70% Solution of bis(2-dimethylaminoethyl) ether in dipropylene glycol.
[(b)]Polysiloxane-polyoxyalkylene block copolymer marketed by Union Carbide Corp.
[(c)]Blend of 92.3 wt.% L-540 and 7.7 wt. % Y-4499 (350 Centistoke dimethyl silicone oil).

polyol component together with the series Polyether Polyol III, IV, V and VI. These latter polyols are all reaction products of glycerine and propylene oxide having average molecular weight of 3000, 2240, 1500 and 700 respectively. A comparison of Tables I and II demonstrate clearly that whereas Example 1, having an adjusted hydroxyl number of 79.3, gave excellent foam to foam bond strengths the Controls D and G using Polyether Polyol IV with an adjusted hydroxyl number of 75.3 gave markedly inferior bond-to-bond strengths. Thus, a blend of conventional polyether polyols with a

EXAMPLES 5-10

A comparison of ethylene glycol with diethylene glycol as the polyol modifier of this invention is shown in Table III. In these examples the base polyether polyol chosen was Polyether Polyol II demonstrating the use of a graft polymer polyol. All of the examples show satisfactory to excellent foam-to-foam bond strengths.

EXAMPLES 11–14

Examples 11–14 show the effectiveness of dipropylene glycol as the polyol modifier of polyurethane foam composition in building foam-to-foam bond strengths. A comparison with controls J and K in which no dipropylene glycol was used demonstrates the effectiveness of this simple polyol modifier in improving foam-to-foam bond strength as demonstrated in Table IV. These data demonstrate that no bond strength is obtained when Polyether Polyol I is used and only 1 pound per linear inch foam-to-foam bond strength obtained when Polyether Polyol II is used in the absence of the polyol modifier, dipropylene glycol.

EXAMPLES 16–18

The practical upper limit of molecular weight of the polyol modifiers was demonstrated by comparing the foam-to-foam bond strengths of polyurethane foams formulated from compositions based on Polyol I and a series of polyethylene glycols and polypropylene glycols of increasing molecular weights (average of mixtures), tetraethylene glycol, and propylene glycol. As can be seen from Table VI, while satisfactory foam-to-foam bond strengths are obtained with polyether glycols outside the scope of this invention one must use increasingly higher and higher amounts in the formulation to achieve equivalent bond strengths. This makes them commercially unacceptable.

TABLE III
EXAMPLES 5 – 10

| EXAMPLE NO. | 5 | 6 | 7 | 8 | 9 | 10 |
|---|---|---|---|---|---|---|
| Polyether Polyol II (parts) | 98 | 98 | 98 | 98 | 98 | 98 |
| Diethylene Glycol (parts) | 2 | 2 | — | — | — | — |
| Ethylene Glycol (parts) | — | — | 2 | 2 | 2 | 2 |
| Water (parts) | 4.3 | 4.3 | 4.3 | 4.3 | 4.3 | 4.3 |
| *Amine Catalyst (parts) | 0.2 | 0.2 | 0.2 | 0.2 | 0.2 | 0.2 |
| Surfactant L-540[1] (parts) | 1.0 | 1.0 | 1.0 | 1.0 | 1.0 | 1.0 |
| Stannous Octoate (parts) | 0.10 | 0.15 | 0.025 | 0.05 | 0.10 | 0.15 |
| Hydroxyl Number of Polyol Blend | 64.3 | 64.3 | 79.2 | 79.2 | 79.2 | 79.2 |
| Cream Time (sec.) | 14 | 14 | 15 | 14 | 14 | 14 |
| Rise Time (sec.) | 106 | 88 | 170 | 137 | 108 | 98 |
| Height of Rise (in.) | 7.9 | 8.6 | 7.3 | 7.8 | 8.5 | 8.8 |
| Breathability (SCFM) | 3.5 | 1.1 | 2.8 | 3.8 | 1.5 | 0.4 |
| Density (pcf) | 1.45 | 1.44 | 1.50 | 1.45 | 1.39 | 1.38 |
| Foam-to-Foam Bond Strength (lbs./inch) | | | | | | |
| 3 cycles | 2.5 | 4.2 | 6.0 | 4.4 | 3.4 | 3.9 |
| 4 cycles | 2.5 | 4.0 | 6.0 | 4.2 | 3.3 | 4.6 |

*blend of a major amount of N,N-dimethylethanolamine and a minor amount of bis(2-dimethylaminoethyl) ether.
[1]Polysiloxane-polyoxyalkylene block copolymer marketed by Union Carbide Corp.

TABLE IV

| EXAMPLE NO. | Control J | Control K | 11 | 12 | 13 | 14 |
|---|---|---|---|---|---|---|
| Polyether Polyol II (parts) | 100 | — | 95 | 70 | 45 | 20 |
| Polyether Polyol I (parts) | — | 100 | — | 25 | 50 | 75 |
| Dipropylene Glycol (parts) | — | — | 5 | 5 | 5 | 5 |
| Water (parts) | 3.0 | 3.0 | 3.0 | 3.0 | 3.0 | 3.0 |
| Amine Catalyst[1] (parts) | 0.2 | 0.2 | 0.2 | 0.2 | 0.2 | 0.2 |
| L-520[2] (parts) | 1.0 | 1.0 | 1.0 | 1.0 | 1.0 | 1.0 |
| Stannous Octoate (parts) | 0.25 | 0.25 | 0.15 | 0.15 | 0.15 | 0.15 |
| 80/20 TDI (100 index) | 35.9 | 36.6 | 42.1 | 42.1 | 42.1 | 42.1 |
| Polyol Blend Hydroxyl Number | 44.1 | 48.1 | 84.5 | 84.7 | 84.6 | 84.2 |
| Cream Time (sec.) | 11 | 10 | 10 | 10 | 10 | 9.5 |
| Rise Time (sec.) | 101 | 99 | 107 | 106 | 118 | 119 |
| Breathability (SCFM) | 2.15 | 2.02 | 1.91 | 1.95 | 2.15 | 2.04 |
| Foam-to-Foam Bond Strength (lbs./inch) | | | | | | |
| 3 cycles | 1.0 | 0.0 | 3.7 | 2.4 | 3.4 | 4.0 |
| 4 cycles | 1.3 | 0.0 | 3.6 | 3.1 | 3.4 | 4.0 |

[1]Blend of a major amount of N,N-dimethylethanolamine and a minor amount of bis (2-dimethylaminoethyl) ether.

EXAMPLE 15

The superiority in foam-to-foam bond strength of a polyurethane foam formulated from a composition containing the polyol modifier, dipropylene glycol, over that of Control L containing an organic polyisocyanate reaction product of an excess of an aromatic polyisocyanate with a diol, designated a Prepolymer Isocyanate, was demonstrated. Control L was carried out with a Prepolymer Isocyanate Prepared by reacting 9.8 grams of dipropylene glycol with 100 parts of the isomeric mixture of 2,4 and 2,6 tolylene diisocyanate (an excess) as disclosed in U.S. Pat. No. 3,497,416. The formulations and the physical properties including foam-to-foam-bond strengths of Example 15 and Control L are shown in Table V. At both three cycles and four cycles the foam-to-foam bond strength, of Example 15, is demonstrated to be superior to Control L.

TABLE V
EXAMPLE 15

| | 15 | Control L |
|---|---|---|
| Polyether Polyol II | 95 | 100 |
| Dipropylene glycol (parts) | 5 | — |
| Water (parts) | 3.0 | 3.0 |
| Amine Catalyst[1] (parts) | 0.15 | 0.30 |
| Stannous Octoate (parts) | 0.15 | 0.10 |
| Silicone surfactant (parts) | 1.0 | 0.5 |
| TDI 80/20 (parts) | 42.1 | 17.1 |
| Prepolymer Isocyanate (parts) | — | 30.25 |
| Cream Time (sec.) | 12 | 12 |
| Rise Time (sec.) | 113 | 187 |
| Height of Rise (in.) | 5.4 | 4.7 |
| Breathability (SCFM) | 1.5 | 1.10 |
| Density (pcf) | 1.95 | 2.26 |
| Foam-To-Foam Bond Strength (lbs./inch) | | |
| 3 cycles | 3.40 | 2.4 |

TABLE V-continued

Polyol I showed very low foam-to-foam bond strengths and were therefore unacceptable.

TABLE VI

| | EXAMPLES 16 - 18 | | | | | | |
|---|---|---|---|---|---|---|---|
| EXAMPLE NO. | 16 | Control M | Control N | Control O | Control P | 17 | 18 |
| Polyether Polyol I (parts) | 94.4 | 91.2 | 87.6 | 86.7 | 54.7 | 94.6 | 98 |
| P.E.G. 200 (parts)[a] | 5.6 | — | — | — | — | — | — |
| P.E.G. 300 (parts)[b] | — | 8.8 | — | — | — | — | — |
| P.E.G. 400 (parts)[c] | — | — | 12.4 | — | — | — | — |
| P.P.G. 425 (parts)[d] | — | — | — | 13.3 | — | — | — |
| P.P.G. 1025 (parts)[e] | — | — | — | — | 45.3 | — | — |
| Tetraethylene Glycol (parts) | — | — | — | — | — | 5.4 | — |
| Propylene Glycol (parts) | — | — | — | — | — | — | 2 |
| Water (parts) | 3.0 | 3.0 | 3.0 | 3.0 | 3.0 | 3.0 | 3.0 |
| Amine Catalyst[1](parts) | 0.1 | 0.1 | 0.1 | 0.1 | 0.1 | 0.1 | 0.1 |
| Stannous Octoate (parts) | 0.10 | 0.15 | 0.15 | 0.15 | 0.20 | 0.15 | 0.15 |
| Surfactant L-520 (parts)[2] | 1.0 | 1.0 | 1.0 | 1.0 | 1.0 | 1.0 | 1.0 |
| TDI 80/20 — 105 index (parts) | 43.1 | 43.1 | 43.1 | 43.1 | 43.1 | 43.1 | 43.1 |
| Additive Molecular Weight | 200 | 300 | 400 | 425 | 1020 | 191 | 76 |
| Cream Time (sec.) | 13 | 13 | 13 | 13 | 12 | 12 | 12 |
| Rise Time (sec.) | 126 | 106 | 105 | 122 | 108 | 100 | 108 |
| Height of Rise (inches) | 4.8 | 5.3 | 5.5 | 5.1 | 5.3 | 5.6 | 5.2 |
| Breathability (SCFM) | 2.5 | 1.4 | 1.0 | 6.0 | 5.0 | 0.6 | 1.7 |
| Density (pcf) | 2.14 | 2.04 | 1.94 | 2.01 | 1.95 | 1.96 | 1.95 |
| Foam-to-Foam Bond Strength (lbs./in.) | | | | | | | |
| 3 cycles | 4.1 | 3.9 | 3.8 | 5.4 | 4.6 | 4.8 | 4.3 |
| 4 cycles | 5.0 | 5.1 | 4.8 | 5.4 | 4.9 | 5.3 | 4.7 |

NOTE: All polyol/modifier blends have 77.5-77.7 hydroxyl numbers.
[1]70% Solution of bis(2-dimethylaminoethyl) ether in dipropylene glycol.
[2]Polysiloxane-polyoxyalkylene block copolymer marketed by Union Carbide Corp.
[a]Polyethylene glycol; molecular weight = 200 (average containing glycols above and below 200)
[b]Polyethylene glycol; molecular weight = 300 (average containing glycols above and below 300)
[c]Polyethylene glycol; molecular weight = 400 (average containing glycols above and below 400)
[d]Polypropylene glycol; molecular weight = 425 (average containing glycols above and below 425)
[e]Polypropylene glycol; molecular weight = 1025 (average containing glycols above and below 1025)

TABLE VII

| EXAMPLE NO. | Control Q | 19 | 20 | 21 | 22 | 23 | 24 | Control R | Control S | 25 |
|---|---|---|---|---|---|---|---|---|---|---|
| Polyether Polyol I (parts) | 100 | 98 | 98 | 98 | 98 | 98 | 98 | 98 | 98 | 97.4 |
| Diethylene Glycol (parts) | — | 2 | — | — | — | — | — | — | — | — |
| Ethylene Glycol (parts) | — | — | 2 | 2 | — | — | — | — | — | — |
| Glycerine (parts) | — | — | — | — | 2 | 2 | — | — | — | — |
| Resorcinol (parts) | — | — | — | — | — | — | 2 | — | — | — |
| Butanol (parts) | — | — | — | — | — | — | — | 2 | — | — |
| Propanol (parts) | — | — | — | — | — | — | — | — | 2 | — |
| Triethanolamine (parts) | — | — | — | — | — | — | — | — | — | 2.6 |
| Water (parts) | 3.0 | 3.0 | 3.0 | 3.0 | 3.0 | 3.0 | 3.0 | 3.0 | 3.0 | 3.0 |
| Amine Catalyst[1] (parts) | 0.1 | 0.1 | 0.1 | 0.1 | 0.1 | 0.1 | 0.1 | 0.1 | 0.1 | 0.1 |
| Stannous Octoate (parts) | 0.25 | 0.15 | 0.15 | 0.5 | 0.5 | 0.025 | 0.025 | 0.20 | 0.20 | 0.05 |
| Surfactant L-520 (parts)[2] | 1.0 | 1.0 | 1.0 | 1.0 | 1.0 | 1.0 | 1.0 | 1.0 | 1.0 | 1.0 |
| Polyol Blend Hydroxyl Number | 49.0 | 69.2 | 84.1 | 84.1 | 84.5 | 84.5 | 68.4 | 63.2 | 66.7 | 77.0 |
| 80/20 TDI (105 index) | 38.4 | 41.7 | 44.1 | 44.1 | 44.2 | 44.2 | 41.6 | 40.7 | 41.3 | 43.1 |
| Cream Time (sec.) | 10 | 12 | 12 | 14.5 | 18 | 25 | 16 | 13 | 13 | 9 |
| Rise Time (sec.) | 104 | 123 | 125 | 163 | 177 | 210 | 190 | 110 | 119 | 140 |
| Height of Rise (inches) | 5.2 | 5.3 | 5.4 | 4.8 | 4.7 | 4.7 | 4.5 | 5.3 | 5.5 | 4.9 |
| Breathability (SCFM) | 3.5 | 1.6 | 0.4 | 6.3 | 0.3 | 0.9 | 2.6 | 5.0 | 3.8 | 0.4 |
| Cells per inch | 45 – 50 | 45 – 50 | 45 – 50 | 45 – 50 | 40.45 | 40.45 | 45.45 | 45 – 50 | 45 – 50 | — |
| Density (pcf) | 1.95 | 1.95 | 1.92 | 2.03 | 1.98 | 2.14 | 2.13 | 1.97 | 1.94 | 2.02 |
| Foam-to-Foam Bond Strength (lbs./inch) | | | | | | | | | | |
| 3 cycles | 0.3 | 3.0 | 3.1 | 2.4 | 2.9 | 2.6 | 4.3 | 0.8 | 0.8 | 3.6 |
| 4 cycles | 0.6 | 2.8 | 3.2 | 2.5 | 2.7 | 2.4 | 4.1 | 0.6 | 0.8 | 4.0 |

[1]70% Solution of bis(2-dimethylaminoethyl) ether
[2]Polysiloxane-polyoxyalkylene block copolymer marketed by Union Carbide Corp.

| EXAMPLE 15 | | |
|---|---|---|
| | 15 | Control L |
| 4 cycles | 3.25 | 2.0 |

[1]Blend of a major amount of N,N-dimethylethanol-amine and a minor amount of bis(2-dimethyl-aminoethyl) ether

EXAMPLES 19-25

The requirement for a polyol as modifier rather than a monohydric alcohol was demonstrated by comparing several Examples containing the modifiers diethylene glycol, ethylene glycol, glycerine, resorcinol or triethanolamine against Controls where butanol, and propanol were used as additives. As can be seen from the data in Table VII, the foam-to-foam bond strengths of formulations using polyol modifiers with Polyol I were good but the formulation of monohydric alcohols and the

EXAMPLES 26-32

FOAMING PROCEDURE II — MACHINE SCALE

A series of comparative machine scale flexible polyurethane foams was prepared at a through-put rate of about 70–80 pounds per minute. The foams were all prepared as follows:

Blends of conventional polyurethane foaming compositions were mixed with the polyol modifiers to be evaluated by weighing the proper amounts into a fifty gallon drum and tumbling several hours to effect mixing. The mixture was referred to as the polyol stream. A constant stream of polyol blend (21,000–22,000 grams per minute) along with an activator stream consisting of water, amine catalyst and silicone surfactant (800–1000 grams per minute), a separate stream consisting of additional silicone surfactant (150-300 grams per minute), a separate stream of auxillary blowing agent (trichlorofluoromethane; 300-500 grams per minute) and a separate stream of tolylene diisocyanate (10,000-11,000 grams per minute) was introduced to a hybrid foam machine under low foam pressure conditions. To prepare flame retardant foams, NIAX Flame Retardant 3CF, tris(2-chloroethyl) phosphate, was added via a separate stream (1300-1500 grams per minute) or a blend of QYNV-1 vinyl resin (polyvinyl chloride dispersion resin sold by Union Carbide Corp.) and antimony oxide was added via the polyol stream.

The mixer speed was 5000 RPM, discharge nozzle 1 inch in diameter, conveyor angle 3.5° and conveyor speed between 8 and 12 feet per minute. At ambient temperatures, the emerging foam mixture was poured onto a continuously moving conveyor belt. The foam was allowed to set and cure in the form of ten foot long 26 inch wide, 18 inch high slabs. After twenty-four hours of aging at ambient temperature, the foams were cut and physical properties determined. The results along with other physical properties are reported in part in Table VIII.

The results in Table IX show excellent foam physical properties are obtained using either diethylene glycol or dipropylene glycol as the modifier polyol. The control T foam exhibits poor humid age compression sets. Humid age compression sets of foams made according to the present invention have good compression sets before and after humid aging.

Bond strength values in all of the examples except Example 27 were superior to the control T. Based on the totality of all of the work in this area including both hand mixed and machine mixed foams the bond strength values of Example 27 are anomalous.

Foams prepared in Examples 26-32 were tested for flame lamination properties according to the following procedure. Foam samples were cut into ½ inch thicknesses and passed into a laminator. The substrate used was a cloth-backed vinyl automotive upholstery material previously marketed by Union Carbide as T-9012. The width of the half-inch foam and T-9012 vinyl/cloth substrate was 36 inches. The laminating flame consisted of propane gas and air in a ratio of 58:400.

The foam was passed over the flame at a given speed and pressed to the substrate with nip rollers set 0.4 inches apart. Foam thickness after lamination was measured and substrated from the original thickness to determine the amount of foam burned off. Bond strengths were determined by tearing the laminates (cut 1 inch × 6 inches) using an Instron machine as described previously. Bond strengths were determined at different times after lamination to determine the rate at which they build. Speed of lamination was varied to make the test more critical. During each test a polyester polyol polyurethane foam of 1.8 pcf density prepared on a commercial machine was used as a control. During Instron testing it was recorded whether or not the bond between the foam and the substrate was separating (referred to as bond tear) or whether the foam was tearing (referred to as foam tear). It is well known in the art, that once the strength of the foam/substrate bond exceeds a certain value, the foam will tear. At this point, it is impossible to determine the foam/substrate bond value. It is also well known in the art that samples that give foam tear are of excellent quality.

The foam physical properties and heat sealing results are presented in Table IX. The flame lamination results are presented in Table X.

It may be concluded from these last data that:

TABLE VIII

EXAMPLE 53 - 60
FORMULATION AND REACTIVITY DATA

| EXAMPLE NO. | | Control T | 26 | 27 | 28 | 29 | 30 | 31 | 32 |
|---|---|---|---|---|---|---|---|---|---|
| Polyether Polyol I (parts) | | 95 | 75 | 75 | 75 | 75 | 75 | 75 | 75 |
| Polyether Polyol II (parts) | | — | 25 | 25 | 25 | 25 | 25 | 25 | 25 |
| Dipropylene Glycol (parts) | | — | 2.0 | — | 4.0 | 2.0 | — | 4.0 | 4.0 |
| Diethylene Glycol (parts) | Stream 1 | — | — | 3.16 | — | — | 3.16 | — | — |
| KM-1⁽¹⁾ (parts) | | 5 | 4.16 | — | — | 4.16 | — | — | — |
| QYNV-1⁽²⁾ (parts) | | — | 10 | — | — | — | — | 10 | — |
| Antimony Oxide (parts) | | — | 5 | — | — | — | — | 5 | — |
| Water (parts) | | 4.0 | 3.0 | 4.0 | 3.0 | 3.0 | 3.0 | 4.0 | 4.0 |
| Catalyst⁽ᴬ⁾ (parts) | Stream 2 | — | 0.10 | 0.125 | 0.125 | 0.125 | 0.125 | 0.125 | 0.125 |
| Catalyst⁽ᴮ⁾ (parts) | | 0.15 | — | — | — | — | — | — | — |
| Silicone Surfactant⁽ᵃ⁾ (parts) | | 0.3 | — | — | — | — | — | — | — |
| Silicone Surfactant⁽ᵇ⁾ (parts) | | — | 0.3 | 0.3 | 0.3 | 0.3 | 0.3 | 0.3 | 0.3 |
| Silicone Surfactant⁽ᵃ⁾ (parts) | Stream 3 | 1.2 | — | — | — | — | — | — | — |
| Silicone Surfactant⁽ᵇ⁾ (parts) | | — | 0.3 | 0.5 | 0.3 | 0.5 | 0.3 | 0.3 | 0.5 |
| Stannous Octoate* (parts) | } Stream 4 | 0.2 | 0.125 | 0.10 | 0.15 | 0.125 | 0.10 | 0.15 | 0.125 |
| 80/20 TDI parts | } Stream 5 | 51.0 | 42.5 | 53.1 | 42.8 | 42.5 | 43.0 | 53.0 | 53.0 |
| index | | 105 | 105 | 105 | 105 | 105 | 105 | 105 | 105 |
| NIAX Flame Retardant 3CF (parts) | } Stream 6 | 7.0 | — | 7.0 | 7.0 | 7.0 | 7.0 | — | 7.0 |
| Trichlorofluoromethane | } Stream 7 | — | 2.0 | 2.0 | 2.0 | 2.0 | 2.0 | 2.0 | 2.0 |
| Cream Time (sec.) | | 4 | 3 | 6.5 | 5 | 5 | 5 | 2.5 | 5 |
| Rise Time (sec.) | | 76 | 62 | 100 | 115 | 112 | 126 | 53 | 104 |
| Gel Time (sec.)** | | 99 | 71 | 119 | 140 | 136 | 153 | 65 | 127 |

*Added to the foam mixture as a 50/50 blend by weight with Polyether Polyol I.
**Gel Time is the time it takes for the foam to reach strength great enough to cause visual resistance to a pipe cleaner as it is pushed into the foam bun.
⁽¹⁾Tris(dipropylene glycol phosphite)
⁽²⁾Polyvinyl Chloride dispersion resin; inherent viscosity 1.17 - 1.35 (ASTM D 1243 Procedure A)
⁽ᴬ⁾70% solution of bis(2-dimethyl aminoethol)ether in dipropylene glycol
⁽ᴮ⁾Major amount of dimethyl ethanolamine and a minor amount of bis(2-dimethylaminoethyl)ether.
⁽ᵃ⁾Silicone polyether copolymer molecular weight ca. 20,000
⁽ᵇ⁾Silicone polyether copolymer molecular weight ca. 10,000

1. Flame lamination properties of the compositions used in the instant invention are excellent by commercial standards. This can be demonstrated by bond strength results as well as the number of Examples giving foam tear.

2. The Control U polyester polyol polyurethane foam bond strength values are higher than those in the Examples due to higher tensile/elongation values of the foam. This is well known in the art and does not detract from the excellent results of the polyether polyol polyurethane foams in the Examples.

3. Humid aging data demonstrates foams prepared according to this invention are superior to polyester foam (Control U) as can be seen from the fact that the latter totally degraded after three 5-hour humid aging cycles resulting in zero bond strength.

This was determined qualitatively immediately after lamination by pulling samples apart. This constitutes a serious commercial disadvantage for foams made according to the composition of Control T.

EXAMPLES 33-38

When Examples 26-32 are repeated with the exception that the cloth-back vinyl automotive upholstery material is replaced by paper, nylon, cotton, leather, rayon acetate, or polyvinyl chloride sheet, respectively, comparable bond strengths are obtained between these substrates and polyurethane foam.

Although the invention has been described in its preferred forms with a certain degree of particularity, it is understood that the present disclosure of the preferred forms has been made only by way of example and that

TABLE IX
EXAMPLES 26 - 32
FOAM PHYSICAL PROPERTIES AND HEAT SEALING RESULTS

| EXAMPLE NO. | Control T | 26 | 27 | 28 | 29 | 30 | 31 | 32 |
|---|---|---|---|---|---|---|---|---|
| Breathability (SCFM) | 2.4 | 1.5 | 2.9 | 1.9 | 3.2 | 1.5 | 2.5 | 4.1 |
| Density (pcf) | 1.56 | 1.91 | 1.47 | 1.79 | 1.82 | 1.79 | 1.57 | 1.49 |
| Tensile Strength (psi) | 21.4 | 19.2 | 18.3 | 19.1 | 17.5 | 17.1 | 19.1 | 17.4 |
| Elongation (%) | 288 | 232 | 207 | 231 | 229 | 202 | 210 | 210 |
| Tear Strength (lbs./inch) | 3.34 | 2.6 | 3.1 | 2.09 | 3.2 | 2.4 | 2.9 | 3.0 |
| ILD 25% | 43 | 42 | 43 | 44 | 39 | 46 | 41 | 41 |
| 65% | 78 | 82 | 82 | 82 | 74 | 85 | 80 | 77 |
| 25% Return | 25 | 25 | 25 | 28 | 25 | 78 | 23 | 24 |
| Compression Set[1] | | | | | | | | |
| 50% | 13.0 | 11.7 | 11.9 | 7.7 | 8.1 | 7.4 | 14.7 | 10.4 |
| 75% | 13.8 | 13.3 | 11.4 | 7.1 | 7.1 | 7.1 | 17.5 | 10.2 |
| 90% | 13.1 | 16.2 | 12.8 | 7.8 | 7.6 | 7.6 | 24.7 | 10.9 |
| Humid Age Compression Sets[1] | | | | | | | | |
| 80% | 26.4 | 28.7 | 14.3 | 13.6 | 14.0 | 12.6 | 51.1 | 19.6 |
| 75% | 33.6 | 67.2 | 23.3 | 13.7 | 15.0 | 14.0 | 68.3 | 21.9 |
| Humid Age Load Loss | 6.3 | 10.1 | 8.0 | 7.9 | 11.7 | 7.2 | 4.7 | 3.5 |
| Foam-to-Foam Bond Strengths (lbs./inch) | | | | | | | | |
| 3 cycles | 1.8 | 4.6 | 1.0 | 2.7 | 3.4 | 2.5 | 4.4 | 3.5 |
| 4 cycles | 2.6 | 4.3 | 1.0 | 2.7 | 2.9 | 3.5 | 4.3 | 3.6 |

[1]Measured in accordance with ASTM 1564 - 68

TABLE X
EXAMPLES 26 - 32
FLAME LAMINATION RESULTS

| EXAMPLE NO. | Control T | 26 | 27 | 28 | 29 | 30 | 31 | 32 | Control U |
|---|---|---|---|---|---|---|---|---|---|
| Test 1 | | | | | | | | | Polyester Control |
| Lamination Speed, 60 ft./min. | | | | | | | | | |
| Bond Strengths After 30 minutes | 2.1 | 0.7 | 2.7 | 2.7 | 3.0 | 2.1 | 1.1 | 2.7 | 4.1 |
| After 60 minutes | 2.8 | 1.1 | 2.6 | 2.6 | 3.0 | 2.1 | 1.4 | 2.6 | 4.0 |
| After 90 minutes | 2.8 | 1.2 | 2.8 | 2.8 | 2.9 | 1.8 | 1.5 | 2.3 | 4.2 |
| After 24 hours | 2.9 | 2.0 | 2.4 | 2.2 | 2.7 | 2.2 | 2.8 | 2.6 | 4.2 |
| Number of samples giving bond tear | 10 | 12 | 4 | 1 | 0 | 0 | 12 | 0 | 4 |
| Number of samples giving foam tear | 2 | 0 | 8 | 11 | 12 | 12 | 0 | 12 | 8 |
| Bond Strengths After 5 hours Humid Aging | 2.0 | 0.4 | 3.5 | 2.1 | 2.4 | 2.3 | 0.7 | 1.7 | 2.4 |
| Bond Strengths After Three 5-Hour Humid Aging cycles | 0.7 | 0.1 | 0.8 | 1.25 | 0.4 | 0.8 | 0.2 | 1.3 | 0.0 |
| Burn off (inches) | 0.045 | 0.045 | 0.050 | 0.040 | 0.030 | 0.030 | 0.050 | 0.040 | 0.040 |
| Test 2 | | | | | | | | | |
| Lamination Speed, 80 ft./min. | | | | | | | | | |
| Bond Strengths | | | | | | | | | |
| After 15 minutes | Not Run | Not Run | 2.1 | 2.1 | 2.1 | 2.0 | Not Run | 1.5 | 2.8 |
| After 90 minutes | " | " | 2.7 | 2.5 | 2.6 | 2.0 | " | 2.3 | 3.6 |
| After 24 hours | " | " | 2.1 | 2.4 | 2.4 | 1.8 | " | 2.3 | 3.2 |
| Number of samples giving bond tear | " | " | 6 | 5 | 6 | 2 | " | 6 | 8 |
| Number of samples giving foam tear | " | " | 3 | 4 | 3 | 7 | " | 3 | 1 |
| Bond Strenghts After 5 hours Huming Aging | " | " | 2.1 | 2.0 | 2.0 | 1.7 | " | 1.5 | 1.5 |
| Bond Strengths After Three 5-Hour Humid Aging Cycles | " | " | 0.7 | 0.8 | 0.6 | 0.8 | " | 0.8 | 0.0 |
| Burn off (inches) | " | " | 0.028 | 0.020 | 0.028 | 0.023 | " | 0.029 | 0.040 |
| Test 3 | | | | | | | | | |
| Lamination Speed, 120 ft./min. | | | | | | | | | |
| Bond Strengths | | | | | | | | | |
| After 30 minutes | " | " | 0.6 | 0.9 | 0.6 | 0.7 | " | 0.7 | 1.5 |
| After 90 minutes | " | " | 0.6 | 1.3 | 0.8 | 0.8 | " | 0.6 | 1.1 |
| After 24 hours | " | " | 0.6 | 0.9 | 0.6 | 0.6 | " | 0.7 | 1.1 |
| Burn off (inches) | " | " | 0.015 | 0.015 | 0.016 | 0.018 | " | 0.018 | 0.013 |

4. Control T laminates took longer to develop bond strength than foam laminates of the present invention.

What is claimed is:

1. Method of thermally bonding flexible polyether polyurethane foam to a substrate which comprises:
  A. reacting and foaming a composition consisting essentially of
    a. a polyisocyanate reactant containing at least two isocyanate groups per molecule;
    b. at least one graft copolymer polyether polyol reactant having a molecular weight of at least about 2000 and containing an average of at least two hydroxyl groups per molecule, said graft copolymer polyether polyol having been produced by polymerizing one or more ethylenically unsaturated monomers dispersed in a polyether polyol in the presence of a free radical catalyst;
    c. a blowing agent;
    d. a catalyst;
    e. a surfactant; and
    f. about 1 to about 7% based on the weight of graft copolymer polyether polyol (b), of at least one polyol modifier selected from the class consisting of:
      1. alkylene glycols having 2 to about 8 carbon atoms;
      2. glycol ethers having the empirical formula;

      $HO\text{---}[C_nH_{2n}O]_m\text{---}H$ wherein $n$ is an integer having values of 2 to 4 and $m$ is an integer having values of 2 to 4 when $n$ is 2, 2 to 3 when $n$ is 3 and 2 when $n$ is 4;
      3. triols having the empirical formula:

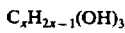
      $C_xH_{2x-1}(OH)_3$ wherein $x$ is an integer having values of 3 to about 10;
      4. alkanolamines having the empirical formula:

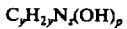
      $C_yH_{2y}N_z(OH)_p$ wherein $y$ is an integer having values of 2 to about 10, $z$ is an integer having values of 1 to 2 and $p$ is an integer having values of 2 to 4; and
      5. polyhydric mononuclear phenols;
  B. Heating the surface of the foamed composition of (A) above its melting or fusion point;
  C. Contacting the melted or fused surface of the foamed composition of (A) with a substrate whereby a flexible polyurethane foam/substrate laminate is formed; and
  D. Cooling the flexible polyurethane foam/substrate laminate below the melting or fusion point of the flexible polyurethane foam.

2. Method claimed in claim 1 wherein the temperature of the melted or fused surface of the flexible polyurethane foam is about 204° C to about 315° C.

3. Method claimed in claim 1 wherein the flexible polyurethane foam surface is melted or fused by passing over a flame at a constant rate of speed.

4. Method claimed in claim 1 wherein the flexible polyurethane foam surface is melted or fused by contact with a heat sealing means.

5. Method claimed in claim 1 wherein the substrate is maintained at ambient temperatures when contacted with the melted or fused surface of the flexible polyurethane foam.

6. Method claimed in claim 1 wherein the graft copolymer polyether polyol is mixed with a polyether polyol which is an adduct of glycerine and a mixture of 1,2-propylene oxide and ethylene oxide.

7. Method claimed in claim 1 wherein the graft copolymer polyether polyol is a graft copolymer of styrene and acrylonitrile onto a glycerine-propylene oxide adduct polymer backbone.

8. Method claimed in claim 1 wherein the polyol modifier (f) is ethylene glycol.

9. Method claimed in claim 1 wherein the polyol modifier (f) is 1,2-propylene glycol.

10. Method claimed in claim 1 wherein the polyol modifier (f) is diethylene glycol.

11. Method claimed in claim 1 wherein the polyol (f) is di(1,2-propylene)glycol.

12. Method claimed in claim 1 wherein the polyol (f) is glycerine.

13. Method claimed in claim 1 wherein the polyol (f) is triethanolamine.

14. Method claimed in claim 1 wherein the polyol (f) is resorcinol.

* * * * *